US009609312B2

United States Patent
Hui

(10) Patent No.: US 9,609,312 B2
(45) Date of Patent: Mar. 28, 2017

(54) ANAGLYPH GHOST CANCELLATION

(71) Applicant: STMicroelectronics Asia Pacific Pte. Ltd., Singapore (SG)

(72) Inventor: Lucas Hui, Singapore (SG)

(73) Assignee: STMICROELECTRONICS ASIA PACIFIC PTE. LTD., Singapore (SG)

(*) Notice: Subject to any disclaimer, the term of this patent is extended or adjusted under 35 U.S.C. 154(b) by 888 days.

(21) Appl. No.: 13/723,584

(22) Filed: Dec. 21, 2012

(65) Prior Publication Data

US 2014/0176687 A1    Jun. 26, 2014

(51) Int. Cl.
*H04N 15/00* (2006.01)
*H04N 13/04* (2006.01)
*H04N 13/00* (2006.01)

(52) U.S. Cl.
CPC ..... *H04N 13/0431* (2013.01); *H04N 13/0007* (2013.01)

(58) Field of Classification Search
CPC ................................................ H04N 13/0431
USPC .......................................................... 348/60
See application file for complete search history.

(56) References Cited

U.S. PATENT DOCUMENTS

| 2010/0289877 A1* | 11/2010 | Lanfranchi | G02B 27/2207 348/46 |
| 2011/0141240 A1* | 6/2011 | Dutta et al. | 348/47 |
| 2014/0300601 A1 | 10/2014 | Hui | |

OTHER PUBLICATIONS

Santfmann et al. Anaglyph Stereo Without Ghosting Eurographics Symposium on Rendering 2011; vol. 30 (2011), No. 4. pp. 9.
Eric Dubois"A Projection Method to Generate Anaglyph Stereo Images" http://www.site.uottawa.ca/~edubois/anaglyph; Retrieved from internet Sep. 23, 2015; pp. 4.
"Anaglyph Methods Comparison" http://3dtv.at/Knowhow/AnaglyphComparison_en.aspx: Retrieved from internet Sep. 23, 2015; pp. 9.

* cited by examiner

*Primary Examiner* — Hung Dang
*Assistant Examiner* — Girumsew Wendmagegn
(74) *Attorney, Agent, or Firm* — Slater Matsil, LLP

(57) ABSTRACT

Ghosting of images can be produced by the use anaglyph techniques to produce stereoscopic images. Ghost effects can be produced when filtering is applied to images by displays such as televisions or monitors. Techniques and apparatus are described for reducing or cancelling ghost effects. Anaglyph ghost reduction information can be produced to reduce or cancel ghost effects.

12 Claims, 7 Drawing Sheets

ANAGLYPH GHOST CANCELLATION

BACKGROUND

Technical Field

The techniques and apparatus described herein relate to image processing, and specifically to the reduction of ghosting of anaglyph images.

Discussion of the Related Art

Anaglyph is a technique for producing stereoscopic (3D) images which may be viewed using spectacles having different color filters for the left and right eyes. Anaglyph techniques allow the viewing of stereoscopic images on conventional two-dimensional displays.

To produce anaglyph images, images for a scene may be separated into left and right views for the left and right eyes, respectively. Each image includes color components, such as red, green, and blue components, for example. In an exemplary technique, the red signal from the left image and the blue and green signals from the right image are combined into a composite image. A viewer may view the composite image as a stereoscopic image through the use of spectacles in which a red filter is located in front of the left eye and a blue filter is located in front of the right eye. For many viewers, the visual cortex interprets a composite anaglyph image as a stereoscopic image.

Various color combinations are available for the colored spectacles that may be worn by the user, including red/blue, red/green, red/cyan, yellow/blue, and green/magenta.

Various anaglyph techniques have been used, such as true anaglyph, grey anaglyph, half color/color anaglyph, and optimized anaglyph, for example.

SUMMARY

Some embodiments relate to a method of reducing ghosting in an anaglyph image. The method includes generating anaglyph image information, producing a ghost cancellation signal, and combining the anaglyph image information and the ghost cancellation signal.

Some embodiments relate to a computer readable storage medium having stored thereon instructions, which when executed by a processor, perform the above method.

Some embodiments relate to an apparatus for reducing ghosting in an anaglyph image. The apparatus includes a processor configured to generate anaglyph image information, produce a ghost cancellation signal, and combine the anaglyph image information and the ghost cancellation signal.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing.

DETAILED DESCRIPTION

One problem with conventional anaglyph techniques is the problem of ghosting. Ghosting is a phenomenon in which an image intended to be viewed by one eye is viewed by the other eye. Ghosting distorts the perception of an image, as features within the image may appear to the viewer to be displayed twice in two different locations. The present inventors have recognized and appreciated that standard 2D displays, such as monitors or televisions, can have filters, such as sharpness filters, to improve the appearance of an image. If an anaglyph image is displayed on such a standard 2D display, the filtering applied by the 2D display can alter the anaglyph image in a manner that produces ghosting. In accordance with the techniques described herein, ghost reduction filtering can be performed to reduce the amount of ghosting that is caused by filtering or other processing in a 2D display.

Figure 1:
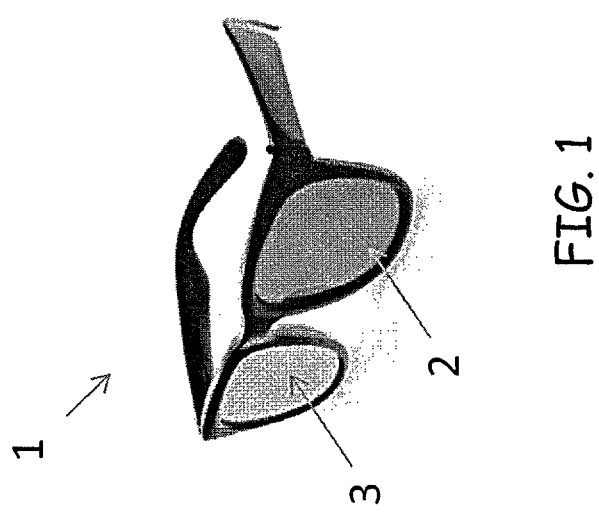
FIG. 1 shows an example of spectacles that may be used for viewing anaglyph stereoscopic images.

FIG. 1 shows an example of spectacles 1 that may be used for viewing anaglyph stereoscopic images, according to some embodiments. As shown in FIG. 1, the left portion of the spectacles 1 corresponding to the left eye includes a first color filter 2 and the right portion of the spectacles corresponding to the right eye includes a second color filter 3 different from the first color filter. As an example, the color filter 2 for the left eye may be a red filter and the color filter 3 for the right eye may be a blue filter. However, the techniques described herein are not limited to the use of red and blue color filters, as any suitable color filters may be used, some examples of which include red/blue, red/green, red/cyan, yellow/blue, and green/magenta.

Figure 2:
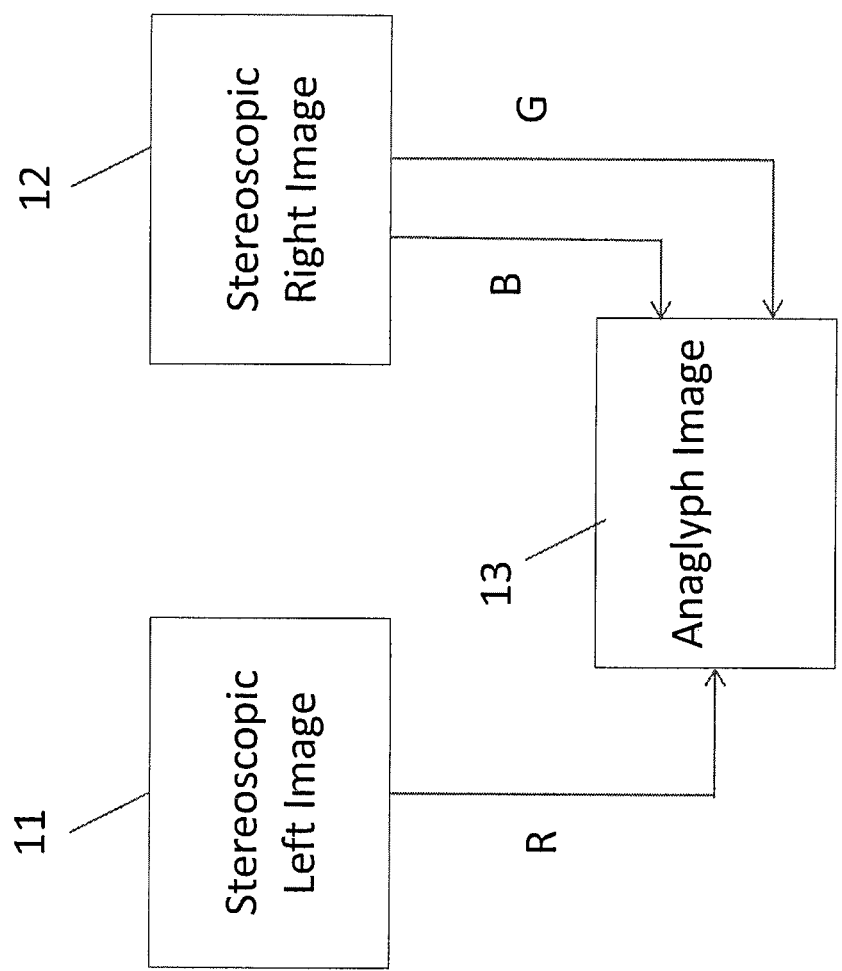
FIG. 2 illustrates an example of a technique for forming an anaglyph image.

FIG. 2 illustrates an example of a technique for forming an anaglyph image. As shown in FIG. 2, a scene may be represented by a stereoscopic left image 11 to be viewed by the left eye and a stereoscopic right image 12 to be viewed by the right eye. Any suitable technique may be used for forming left and right stereoscopic images. An anaglyph image 13 may be formed by combining one or more color component(s) of the stereoscopic left image 11 with one or more color component(s) of the stereoscopic right image 12. For example, as illustrated in FIG. 2, the red component R of the stereoscopic left image 11 may be combined with the blue and green components B,G of the stereoscopic right image 12 to form the anaglyph image. When the anaglyph images are viewed by a viewer wearing spectacles such as those illustrated in FIG. 1, the user may perceive a stereoscopic view of a scene.

The anaglyph image may be provided to a 2D display, such as a monitor or television, for display to the user. However, as discussed above, often a 2D display may be configured to apply filtering to received images. For example, filtering may be performed to improve the sharpness and/or the contrast of an image. Such filtering may change the color components included in an anaglyph image. For example, the red component R of the anaglyph image of FIG. 2 intended to be viewed by the left eye may be modified as a result of the filtering based on the blue and green components in the stereoscopic right image.

Figure 3:
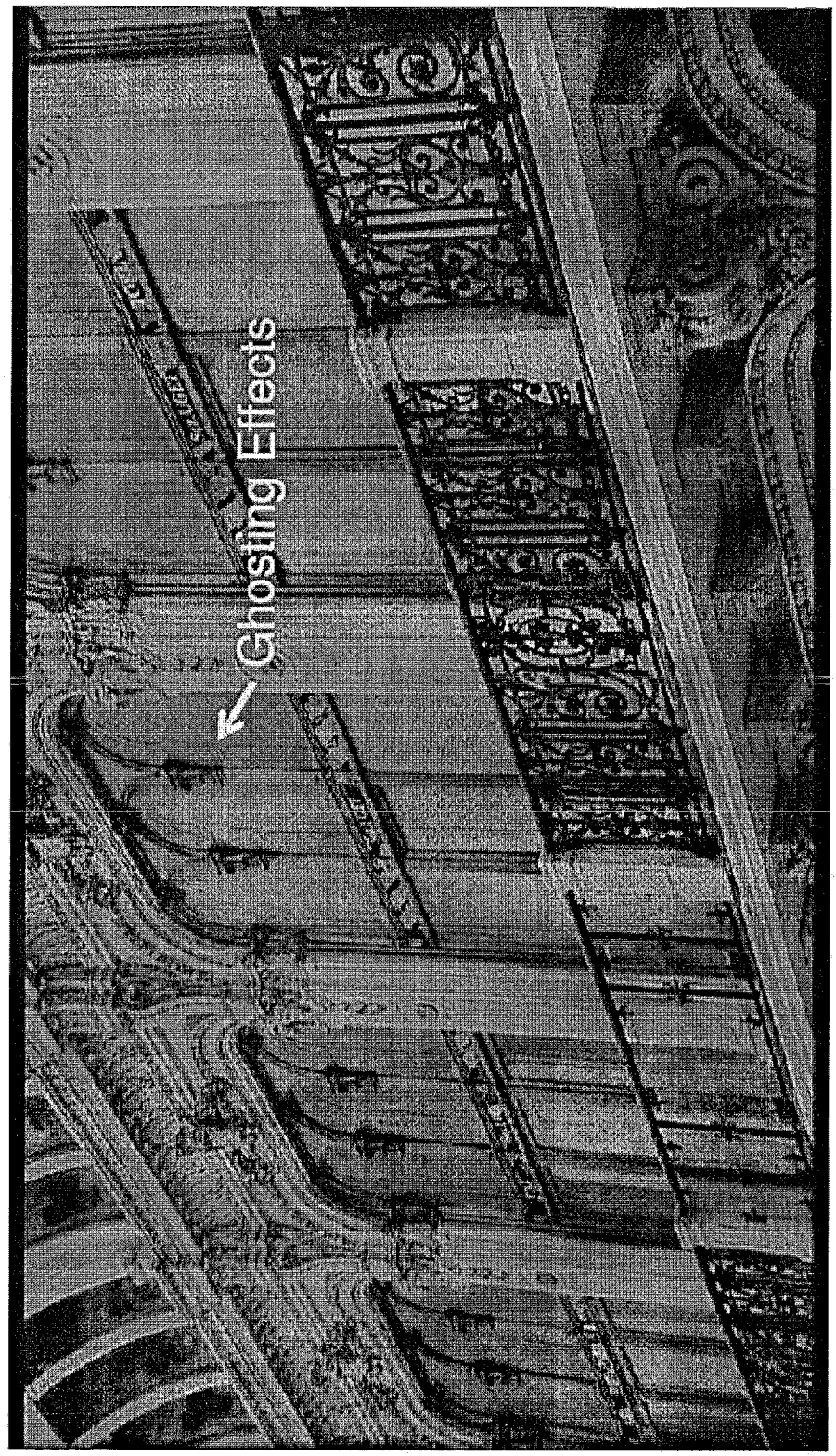
FIG. 3 illustrates the red component of an anaglyph image of after sharpness filtering is performed.

FIG. 3 illustrates the red component of the anaglyph image of FIG. 2 after sharpness filtering is performed. As shown in FIG. 3, the sharpness filtering produces ghosting in the red component of the anaglyph image.

Figure 4:
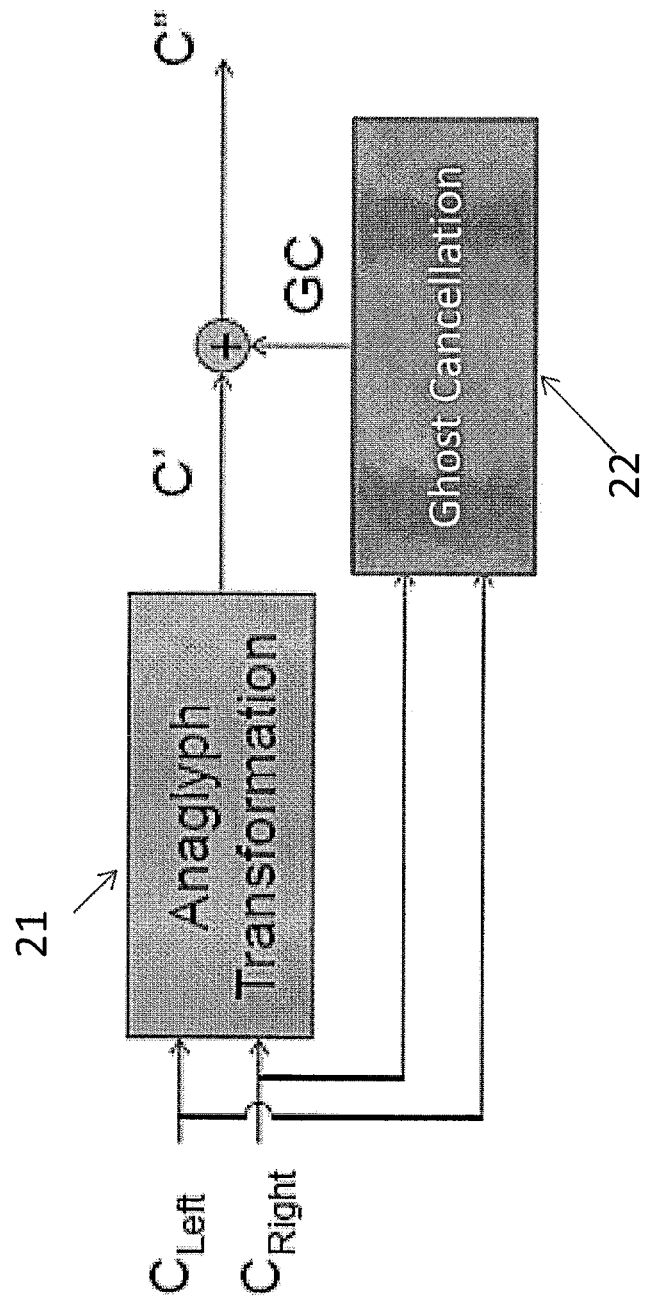
FIG. 4 shows a block diagram illustrating a technique for reducing or eliminating ghosting of anaglyph images.

FIG. 4 shows a block diagram illustrating a technique for reducing or eliminating ghosting of anaglyph images. As illustrated in FIG. 4, an anaglyph transformation 21 can be performed using the color information for left and right images, $C_{Left}$ and $C_{Right}$, respectively, to produce anaglyph information C'. Any suitable type of anaglyph transformation 21 may be performed, including anaglyph techniques known in the art, for example. A ghost cancellation signal GC can be produced by ghost cancellation processing 22 using the color information for left and/or right images, $C_{Left}$ and $C_{Right}$, respectively. The ghost cancellation signal GC and the anaglyph information C' can be summed to produce corrected anaglyph information C''. The corrected anaglyph information C'' may be provided to a 2D display for display to a viewer.

In some embodiments, the ghost cancellation processing 22 is designed to reduce or eliminate the effects of image processing performed subsequently by the 2D display. For example, the ghost cancellation processing 22 may be designed to reduce or eliminate the effects of a sharpness filter that is subsequently applied to the corrected anaglyph information C''. By reducing or eliminating the effect of a filter that is applied by the 2D display, the ghosting of anaglyph images can be reduced or eliminated.

Figure 5:
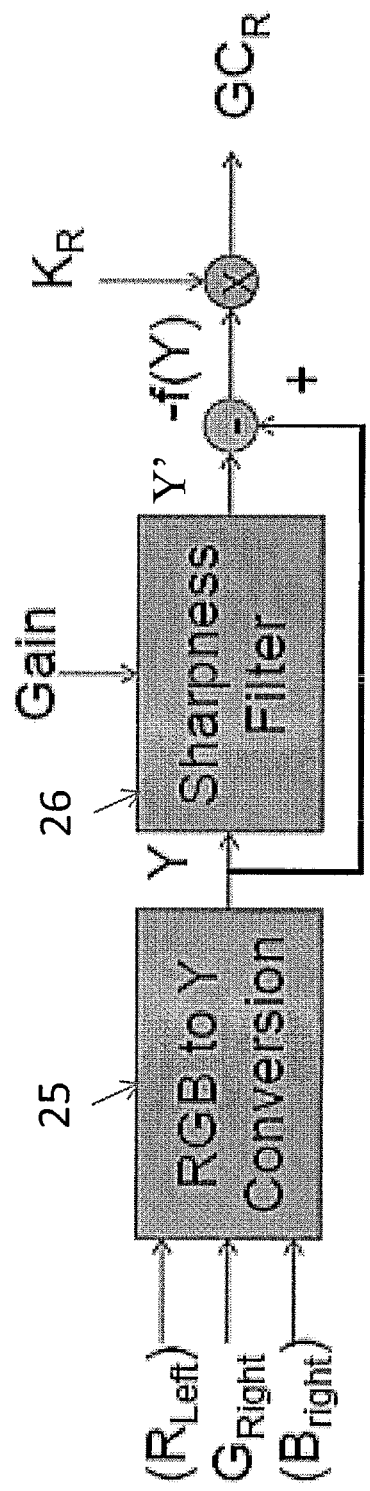
FIG. 5 shows an example of ghost cancellation processing for producing a ghost cancellation signal.

FIG. 5 shows an example of ghost cancellation processing for producing a ghost cancellation signal $GC_R$ for the red component. As shown in FIG. 5, the red component R of the stereoscopic left image and the blue and green components B,G of the stereoscopic right image 12 may be combined to produce luminance information Y for the anaglyph image in processing step 25. Filtering 26 may then be applied to the luminance information Y as an approximation of the filtering that is performed by the 2D display. Optionally, an adjustable filter gain may be applied in the filtering 26, as shown by the Gain input in FIG. 5. The filtered result Y' is then subtracted from the luminance information Y. An optional gain $K_R$ may be applied to the resulting signal –f(Y). The ghost correction signal $GC_R$ for the red component may thereby be produced as $K_R$ (–f(Y)).

Figure 6:
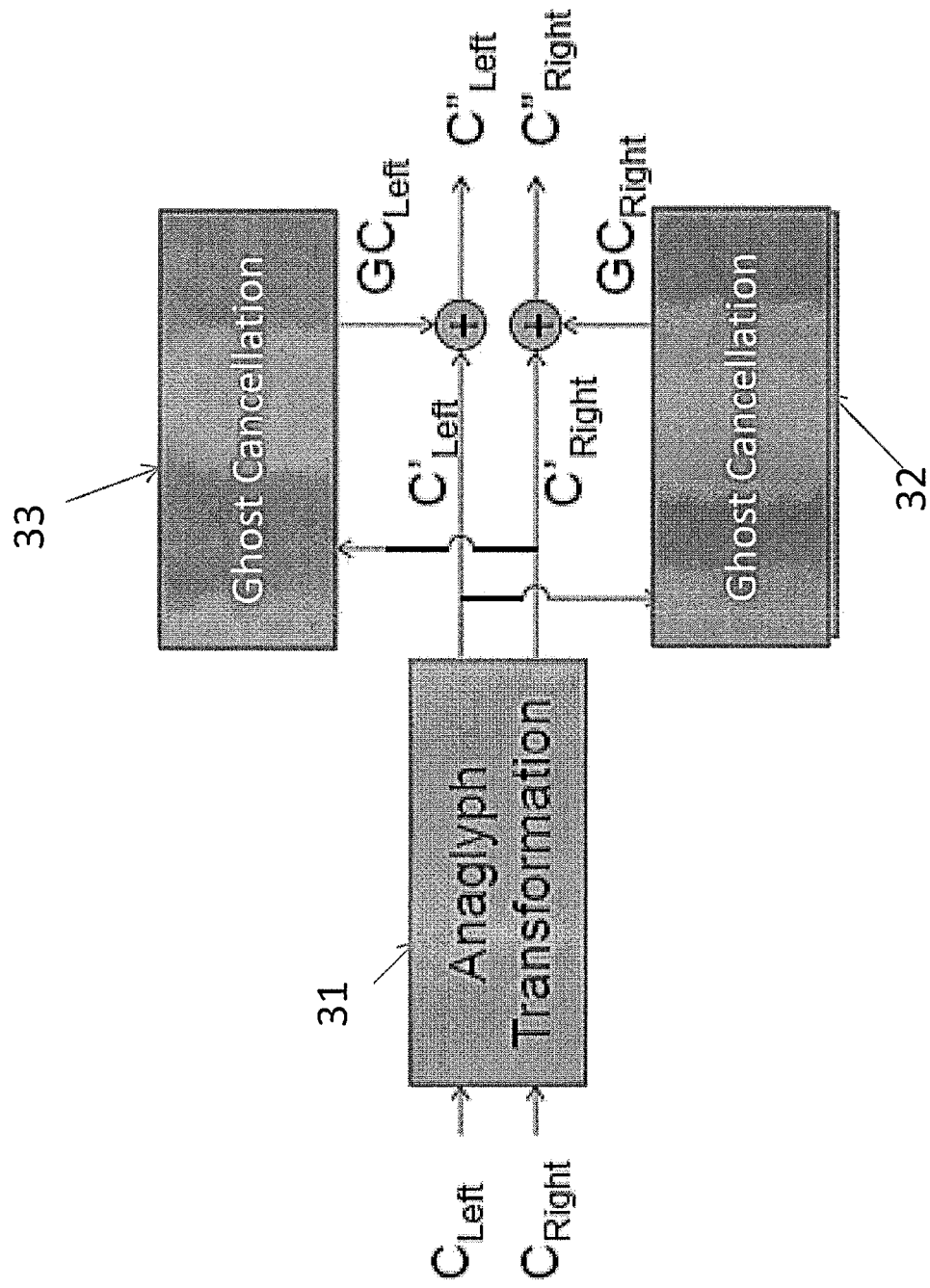
FIG. 6 shows another embodiment of a technique for reducing or eliminating ghosting of anaglyph images using left and right ghost cancellation signals.

FIG. 6 shows another embodiment of a technique for reducing or eliminating ghosting of anaglyph images using left and right ghost cancellation signals. As illustrated in FIG. 6, an anaglyph transformation 31 can be performed using the color information for left and right images, $C_{Left}$ and $C_{Right}$, respectively, to produce anaglyph information for left and right anaglyph images C'$_{Left}$ and C'$_{Right}$, respectively. Any suitable type of anaglyph transformation 31 may be performed, including anaglyph techniques known in the art, for example. A ghost cancellation signal for left images $GC_{Left}$ can be produced by ghost cancellation processing 33 using the color information for the right images C'$_{Right}$. A ghost cancellation signal for right images $GC_{Right}$ can be produced by ghost cancellation processing 32 using the color information for the left images C'$_{Left}$. The ghost cancellation signal $GC_{Left}$ and the anaglyph information C'$_{Left}$ can be summed to produce corrected anaglyph information C''$_{Left}$. The ghost cancellation signal $GC_{Right}$ and the anaglyph information C'$_{Right}$ can be summed to produce corrected anaglyph information C''$_{Right}$.

A particular example will now be described for cancelling the ghosting produced by a conventional sharpness filter of a 2D display, according to some embodiments. A conventional 2D display sharpness filter may be applied to the luminance Y signal of an anaglyph image where Y=A× $G_{Right}$+B×$B_{Right}$+C×$R_{Left}$, and A, B and C are selected coefficients. In one example, A=0.7152, B=0.0722 and C=0.2126. However, the techniques described herein are not limited in this respect. Since R'$_{Left}$=Y'+1.5748Pr, where Y'=Y+f(Y), Y' and R'$_{Left}$ are the luma and red component out of the 2D display. Pr, the input chroma signal is as follows: Pr=–0.4542$G_{Right}$–0.0458$B_{Right}$+0.5000$R_{Left}$, therefore R'$_{Left}$=$R_{Left}$+f(Y), or ~$R_{Left}$+f(0.7152$G_{Right}$+0.0722$B_{Right}$)+ f(0.2126 $R_{Left}$). f(Y) or specifically f(0.7152$G_{Right}$+ 0.0722$B_{Right}$) from the right image is creating ghosting effects at the left eye. Thus the ghost cancellation signal for red $GC_R$~–$K_R$×f(Y) or ~–$K_R$×f(0.7152$G_{Right}$+ 0.0722$B_{Right}$). Similarly, $GC_{G/B}$~–$K_{G/B}$×f(0.2126 $R_{Left}$) for green or blue. Such calculations may be different for other anaglyph techniques, for example.

Figure 7:
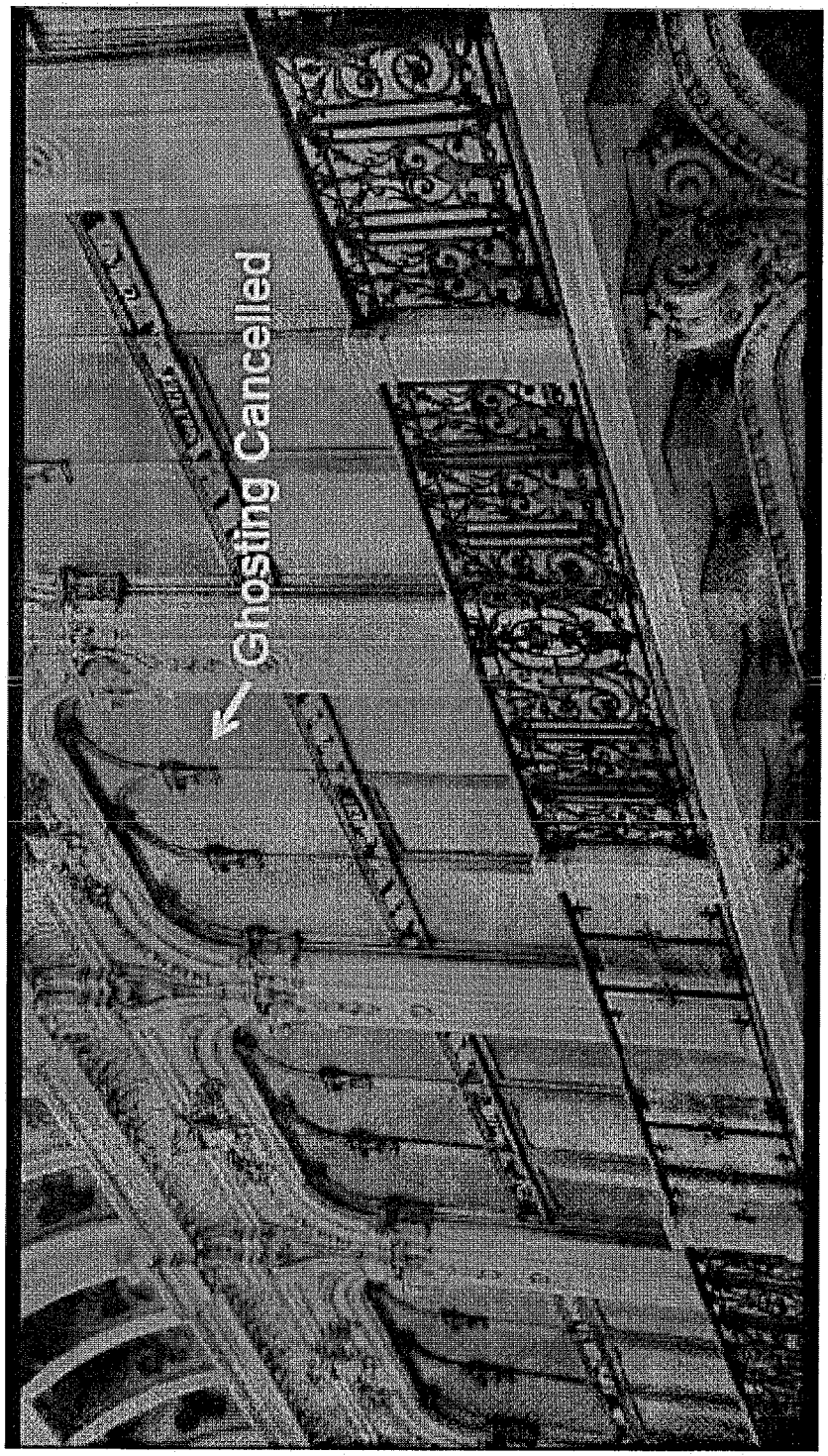
FIG. 7 illustrates the cancellation of the ghost signal in the red image.

FIG. 7 illustrates the cancellation of the ghost signal in the red image by applying a ghost cancellation signal as discussed above. As shown in FIG. 7, the ghosting apparent in FIG. 3 has been removed.

In some embodiments, fewer than three colors may be used to approximate the luminance information Y, as in the case of a Red$_{Left}$/Cyan$_{Right}$ anaglyph, for example, the luminance signal Y for determining $GC_R$ may be determined using a combination of $R_{Left}$/$G_{Right}$/$B_{Right}$, a combination of $G_{Right}$/$B_{Right}$ or just $G_{Right}$. The R/G/B combination may be modified according to any anaglyph left/right or color pair.

One exemplary unsharp mask shown below may be used to simulate a sharpness filter:

$$\text{Unsharp mask} = \frac{1}{36}\begin{bmatrix} 0 & 1 & 2 & 1 & 0 \\ 2 & 4 & 16 & 4 & 2 \\ 0 & 1 & 2 & 1 & 0 \end{bmatrix}$$

An exemplary K'$_R$ value is 1.0, however, any suitable value may be selected. In some embodiments, the gain and K signals of FIG. 5 may be combined into a single applied gain K'.

The techniques described herein are not limited to compensating for the effects of a sharpness filter, as the f(Y) signal may be produced based on any of a variety of filters expected to be present in a two-dimensional display. For example, f(Y) may be produced using a peaking filter, high pass filter, unsharp mask, or any other suitable filter, such as conventional sharpness enhancement filters.

A shift left/right function may be applied to the ghost cancellation signal to compensate for any chroma phase shift performed by the 2D display. K, or K' and/or the shift left/right to functions may be fixed, controlled by a user, or controlled automatically by a feedback system (e.g., using a camera viewing the 2D display). To simply calculation, a ghost cancellation may be calculated for the ghost effect caused only by the green signal, in some embodiments.

Figure 8:
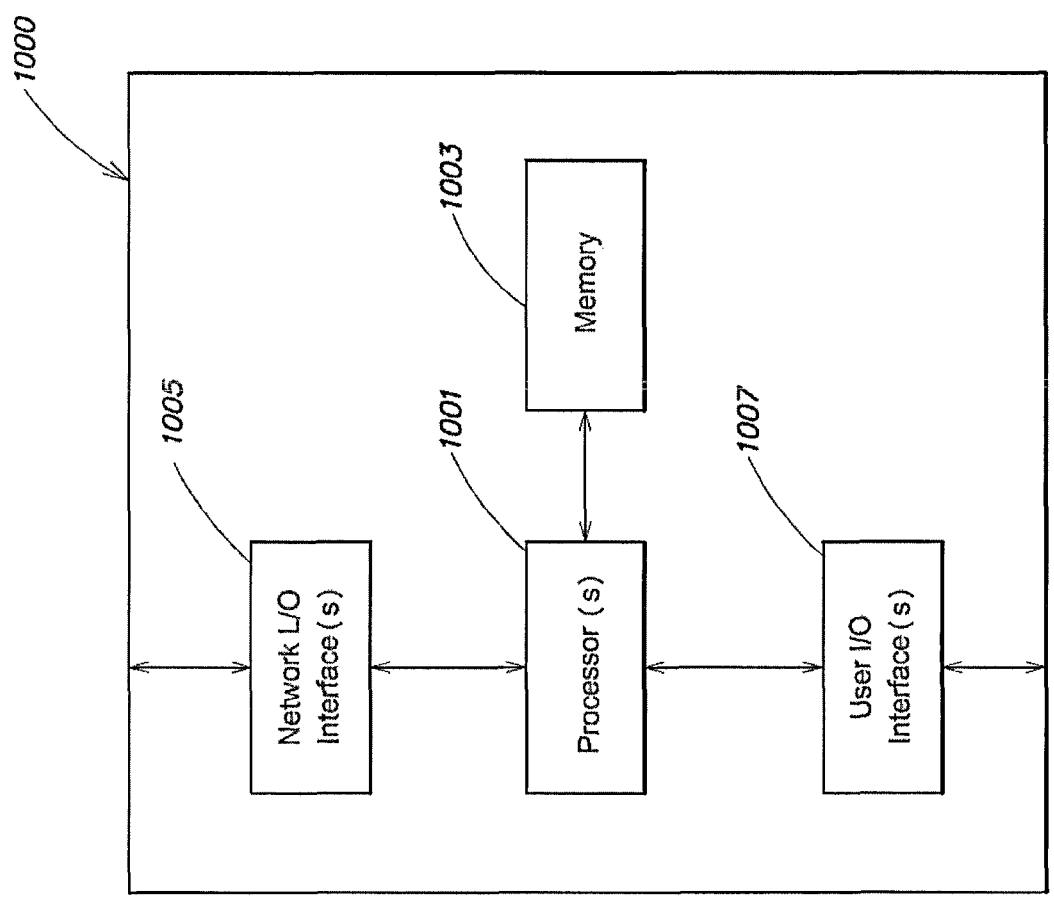
FIG. 8 is a block diagram of an illustrative computing device.

FIG. 8 is a block diagram of an illustrative computing device 1000 that may be used to implement any of the above-described techniques, including ghost cancellation processing or anaglyph transformation. Computing device 1000 may include one or more processors 1001 and one or more tangible, non-transitory computer-readable storage media (e.g., memory 1003). Memory 1003 may store, in a tangible non-transitory computer-recordable medium, computer program instructions that, when executed, implement any of the above-described functionality. Processor(s) 1001 may be coupled to memory 1003 and may execute such computer program instructions to cause the functionality to be realized and performed.

Computing device 1000 may also include a network input/output (I/O) interface 1005 via which the computing device may communicate with other computing devices (e.g., over a network), and may also include one or more user I/O interfaces 1007, via which the computing device may provide output to and receive input from a user. The user I/O interfaces may include devices such as a keyboard, a mouse, a microphone, a display device (e.g., a monitor or touch screen), speakers, a camera, and/or various other types of I/O devices.

The above-described embodiments can be implemented in any of numerous ways. For example, the embodiments may be implemented using hardware, software or a combination thereof. When implemented in software, the software code can be executed on any suitable processor (e.g., a microprocessor) or collection of processors, whether provided in a single computing device or distributed among multiple computing devices. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments described herein comprises at least one computer-readable storage medium (e.g., RAM, ROM, EEPROM, flash memory or other memory technology, CD-ROM, digital versatile disks (DVD) or other optical disk storage, magnetic cassettes, magnetic tape, magnetic disk storage or other magnetic storage devices, or other tangible, non-transitory computer-readable storage medium) encoded with a computer program (i.e., a plurality of executable instructions) that, when executed on one or more processors, performs the above-discussed functions of one or more embodiments. The computer-readable medium may be transportable such that the program stored thereon can be loaded onto any computing device to implement aspects of the techniques discussed herein. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

The techniques and apparatus described herein are not limited in its application to the details of construction and the arrangement of components set forth in the foregoing description or illustrated in the drawings. The techniques and apparatus described herein are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. An image processing method for generating images for a two-dimensional (2D) image display, the 2D image display comprising at least one image filter device for filtering images displayed thereon, the method comprising:

for left and right anaglyph image signals corresponding to a common image and having respective different color filtering applied thereto, generating a left ghost cancellation signal based upon the right anaglyph image signal configured to cancel the filtering thereof by the at least one image filter device of the 2D image display, and generating a right ghost cancellation signal based upon the left anaglyph image signal configured to cancel the filtering thereof by the at least one image filter device of the 2D image display;

combining the left and right anaglyph image signals with the left and right ghost cancellation signals, respectively, to generate corrected anaglyph signals; and outputting the corrected anaglyph signals to the 2D image display.

2. The method of claim 1 wherein combining comprises summing the left and right anaglyph image signals with the left and right ghost cancellation signals, respectively.

3. The method of claim 1 wherein the at least one image filter device comprises a sharpness filter.

4. The method of claim 1 wherein the at least one image filter device comprises at least one of a peaking filter, a high pass filter, and an unsharp mask.

5. A non-transitory computer-readable medium for causing an image processing apparatus to generate images for a two-dimensional (2D) image display, the 2D image display comprising at least one image filter device for filtering images displayed thereon, and the non-transitory computer-readable medium having computer-executable instructions for causing the image processing apparatus to perform steps comprising:

for left and right anaglyph image signals corresponding to a common image and having respective different color filtering applied thereto, generating a left ghost cancellation signal based upon the right anaglyph image signal configured to cancel the filtering thereof by the at least one image filter device of the 2D image display, and generating a right ghost cancellation signal based upon the left anaglyph image signal configured to cancel the filtering thereof by the at least one image filter device of the 2D image display;

combining the left and right anaglyph image signals with the left and right ghost cancellation signals, respectively, to generate corrected anaglyph signals; and outputting the corrected anaglyph signals to the 2D image display.

6. The non-transitory computer-readable medium of claim 5 wherein combining comprises summing the left and right anaglyph image signals with the left and right ghost cancellation signals, respectively.

7. The non-transitory computer-readable medium of claim 5 wherein the at least one image filter device comprises a sharpness filter.

8. The non-transitory computer-readable medium of claim 5 wherein the at least one image filter device comprises at least one of a peaking filter, a high pass filter, and an unsharp mask.

9. An image processing apparatus for generating images for a two-dimensional (2D) image display, the 2D image display comprising at least one image filter device for filtering images displayed thereon, said image processing apparatus comprising:

a processor and a memory cooperating therewith to
for left and right anaglyph image signals corresponding to a common image and having respective different color filtering applied thereto, generate a left ghost cancellation signal based upon the right anaglyph image signal configured to cancel the filtering thereof by the at least one image filter device of the 2D image display, and generate a right ghost cancellation signal based upon the left anaglyph image signal configured to cancel the filtering thereof by the at least one image filter device of the 2D image display, combine the left and right anaglyph image signals with the left and right ghost cancellation signals, respectively, to generate corrected anaglyph signals, and output the corrected anaglyph signals to the 2D image display.

10. The apparatus of claim 9 wherein said processor is configured to sum the left and right anaglyph image signals with the left and right ghost cancellation signals, respectively.

11. The apparatus of claim 9 wherein the at least one image filter device comprises a sharpness filter.

12. The apparatus of claim 9 wherein the at least one image filter device comprises at least one of a peaking filter, a high pass filter, and an unsharp mask.

* * * * *